No. 660,445. Patented Oct. 23, 1900.
C. LILLICRAP.
PNEUMATIC TIRE PRESSURE GAGE.
(Application filed Jan. 16, 1900.)

(No Model.)

Fig. 2ª

Witnesses
William Miller
Chas. E. Benagen

Inventor
Charles Lillicrap
By Hauff & Hauff
His Attorneys

UNITED STATES PATENT OFFICE.

CHARLES LILLICRAP, OF SWANSEA, ENGLAND.

PNEUMATIC-TIRE PRESSURE-GAGE.

SPECIFICATION forming part of Letters Patent No. 660,445, dated October 23, 1900.

Application filed January 16, 1900. Serial No. 1,820. (No model.)

*To all whom it may concern:*

Be it known that I, CHARLES LILLICRAP, a subject of the Queen of Great Britain and Ireland, and a resident of 59 Robert street, Manselton, Swansea, England, have invented a new or Improved Pneumatic-Tire Pressure-Gage, (for which I have obtained a provisional British patent, No. 10,378, dated May 17, 1899,) of which the following is a specification.

This invention relates to a simple apparatus by which a leak or diminution of pressure in a pneumatic tire can be readily determined; and the invention resides in the novel features of construction set forth in the following specification and claims and illustrated in the annexed drawings, in which—

Figure 1:
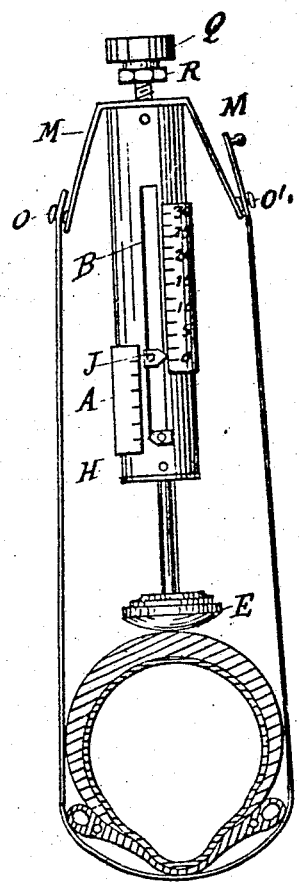
Figure 2:
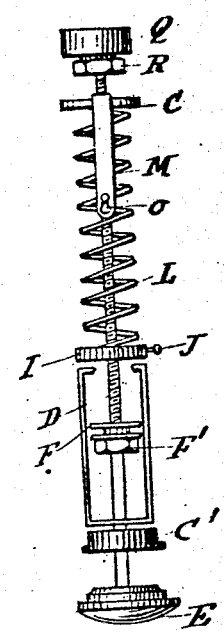
Figure 3:
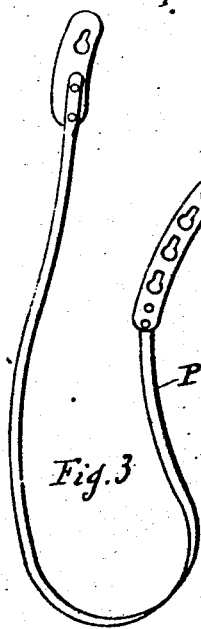

Figure 1 shows a face elevation of the apparatus applied to a tire, the latter being sectioned. Fig. 2 is a view like Fig. 1, the case or cylinder being removed to expose the contained mechanism. Fig. 2ª is a detail. Fig. 3 shows a flexible band or strap.

In the drawings is shown a cylindrical box or case, comprising the wall or shell A, with the covers C and C' closing the ends of the shell, the latter having a slot or opening B and scales at opposite sides of the slot. A stem D extends through or is guided by the covers and has at one end a shoe E, which can turn or swivel on the stem, so that the stem and shoe are rotary with respect to one another. Slipped ont stem D and supported by cover C' is a stay or support J', as seen in Fig. 2. The stem D is screw-threaded, and to this stem is screwed a nut F', a grooved disk F being screwed to or seated about the stem above this nut. Into the groove of this disk are slipped the branches of the fork G, (shown in detail at Fig. 2ª,) this fork carrying a pointer H at one of the scales on shell A. Screwed or secured to the stem is also a disk I, which carries a second pointer J for the second scale. The spring L, seated about the stem, rests against or is made to be compressed between disk I and shell-cover C. To the top of the stem are screwed a nut R and finger button or handle Q, which is locked by or jammed against nut R, so as to be fixed to the stem and enable the latter to be turned by the handle Q. When the spring L is free to press pointers J H in the direction away from cover C, the nut F comes to rest on bottom cover C' and disk I comes to rest on brace or legs J'. The pointer H is thus prevented from striking against or being bent or distorted by the lower boundary or termination of slot B.

Secured to cover C is a strap or metal band M, having buttons O O'. A strap P has a series c eyes which can be slipped onto the lugs or buttons O O', so as to form the strap P into a loop of greater or less diameter, as required.

The manner of using the device is simple and readily understood. Say that the rider has the tire inflated to the required pressure. The shoe E is placed against the tire and the shell A pressed toward the tire to compress spring L and the strap P looped about the tire or felly and secured to buttons O O'. Note is now taken of the point at which either pointer H or J stands—as, for example, note is made of the pointer J standing at number "20" on its scale. The gage is now dismounted or put aside and the vehicle is put in use. After a certain run or lapse of time the gage is reapplied, as before, and if the pointer J is then again at "20" it shows that no leak or deflation of the tire has occurred; contrariwise if the pointer J now stands at, say, "15" or if pointer H should have shifted, for example, from "0" to "1."

The scale of pointer H, it is noted, is numbered consecutively, as "0," "1," "2," and so on, while the scale of pointer J runs by fives. These arrangements can be varied if seen fit; but the numberings shown have been found convenient in practice.

In the device shown in the drawings the duplicate pointers and scales were used together at the same time, the upper or right-hand scale was arranged or graduated to indicate pounds per square inch, and the other scale represented parts of an inch.

What I claim as new, and desire to secure by Letters Patent, is—

1. A gage for indicating pressure in pneumatic tires said gage comprising a slotted case or shell having covers C C' and scales at the slot, a sliding spring-pressed stem extended through the covers and having a shoe to sit against the tire and pointers to travel along the scales, and lugs or buttons for securing a strap about the tire to hold the shoe in contact with such tire, substantially as described.

2. A gage for indicating pressure in pneumatic tires said gage comprising a slotted case or shell having covers C C' and scales at the slot, a sliding spring-pressed stem extended through the covers and having a shoe to sit against the tire and pointers to travel along the scales, a disk I and brace J' for arresting the pointers, and lugs or buttons for securing a strap about the tire to hold the shoe in contact with such tire, substantially as described.

3. A slotted case or shell and a screw-stem guided by or slidable through the case, a shoe on the stem, a pointer-carrying grooved disk F and a second pointer-carrying disk I on the stem, a nut F' and brace J' for the disks, a spring made to press against disk I to move the stem, and a strap and loop M P for the case, substantially as described.

4. A slotted case or cylinder A having a scale and covers C C', a screw-stem D guided through the covers, a loose or swiveling shoe at the bottom of the stem, pointer-carrying disks F I on the stem, a spring L braced between a disk and a cover, a strap M secured to the case, a strap P adapted to be looped or secured to the first-named strap, a handle-nut Q on the stem, and a lock or jam nut R for the handle-nut, substantially as described.

CHARLES LILLICRAP.

Witnesses:
CHARLES HENRY NEWBURY,
FREDERICK WILLIAM SMITH.